Oct. 11, 1966 J. G. POTTIER 3,277,604
EQUIPMENT, MORE PARTICULARLY FOR TREATING
PLANTLETS BY "COLD SHOCKS"
Filed Oct. 21, 1963 3 Sheets-Sheet 2

Oct. 11, 1966  J. G. POTTIER  3,277,604
EQUIPMENT, MORE PARTICULARLY FOR TREATING
PLANTLETS BY "COLD SHOCKS"
Filed Oct. 21, 1963
3 Sheets-Sheet 3
Fig. 3
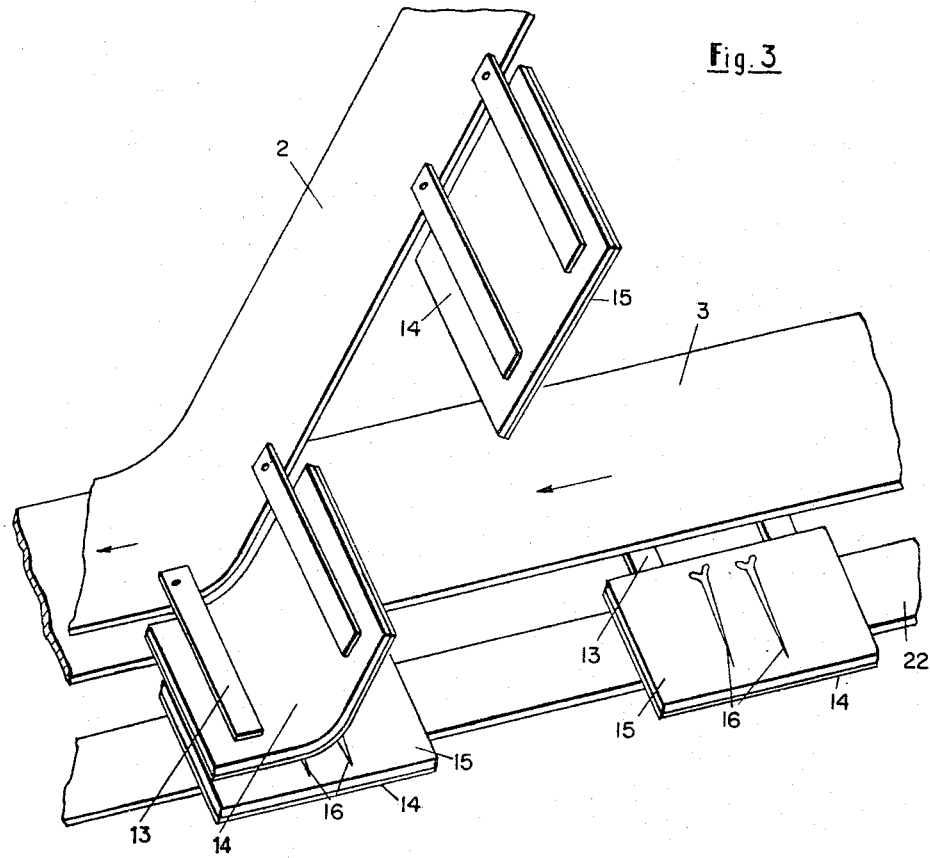
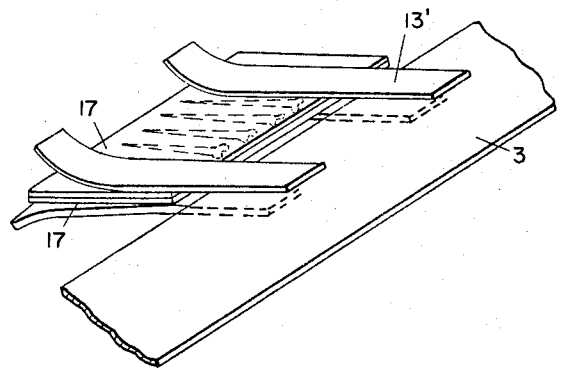
Fig. 4

United States Patent Office 3,277,604
Patented Oct. 11, 1966

3,277,604
EQUIPMENT, MORE PARTICULARLY FOR TREATING PLANTLETS BY "COLD SHOCKS"
Jacques Georges Pottier, 123–125 Rue Notre Dame des Champs, Paris, France
Filed Oct. 21, 1963, Ser. No. 317,429
Claims priority, application France, Sept. 24, 1963, 948,532, Patent 84,491
9 Claims. (Cl. 47—1)

An equipment for treating plantlets by cold shock has already been described in my patent application No. 306,742. According to that application, the equipment successively comprises a refrigerating apparatus and a reheating apparatus, through which the live plantlets to be treated are conveyed by means of endless conveyor belts, in order to modify by cold shock the biochemical characteristics of the plants.

With regard to this device, the present invention has the object of providing apparatus in which the plantlets being treated are carried at an edge of the conveyor, the plantlet-holding members are spaced lengthwise along the conveyor, and said members may be removed from the conveyor to permit application of plantlets to the holding members away from the conveyor.

Other objects and advantages of the invention will be revealed by the description and claims given hereafter, as well as the attached drawings, in which:

FIG. 3 is an enlarged fragmentary perspective view of the conveyor belts at the loading station; and FIG. 4 is a fragmentary perspective view of the lower belt in the treatment zone.

Figure 1:
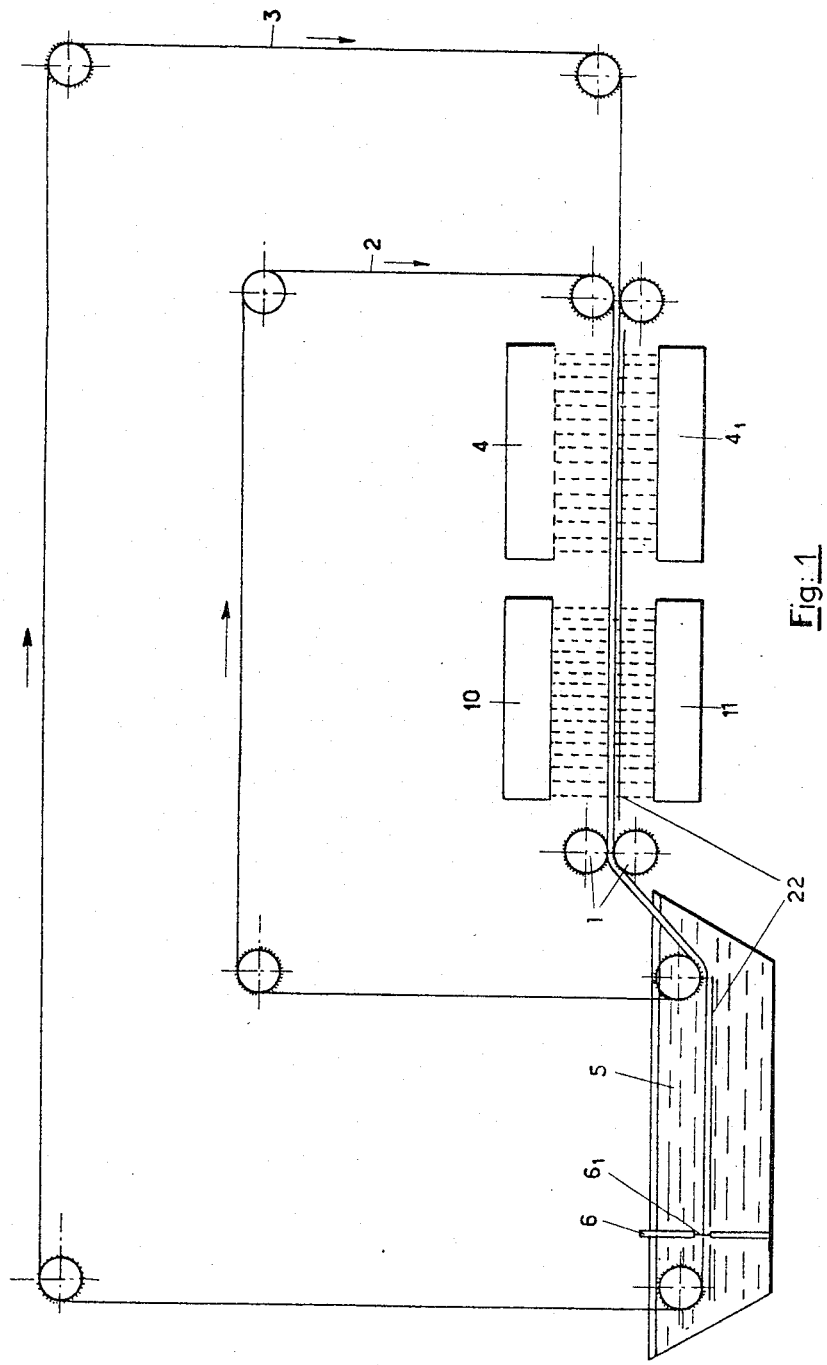
FIG. 1 is a diagrammatic side view of one form of my apparatus.

According to the invention, the treatment of plantlets is carried out as they are carried by an endless traveling conveyor through a treatment zone which, as shown in FIG. 1, includes refrigerating or cold shock apparatus $4-4_1$ and reheating apparatus 10–11 as explained more fully in my copending application No. 306,742. The conveyor illustrated is made up of a pair of endless belts 2 and 3 forming large and small loops, the small loop being inside the large one and both of them disposed in the same vertical plane. The vertically extending lengths of the loops are spaced a considerable distance apart to provide loading and unloading stations, but the horizontal portions of the loops that extend through the treatment zone between those stations are close together. The two belts are driven at the same speed by any suitable means, such as driving means connected to rollers 1 engaging the belts at the outlet or downstream end of the treatment zone.

After the belts leave the rollers just mentioned, they are directed down into a tank 5 full of water. The inner belt 2 leaves the tank very soon after it enters it, but the other belt extends through the tank toward the opposite end and then up out of it. Consequently, a length of the outer belt in the tank is exposed to permit removal of the treated plantlets therefrom by a current of water circulating in the tank or by any other suitable manner. To ensure that none of the plantlets will be carried too far through the tank, it is provided with a vertical partition 6 having a slot through it for passage of belt 3. A brush $6_1$ in the slot will stop any plantlets that are carried that far by the belt.

Extending along each belt, as shown in FIG. 3, is a row of flexible metal plates 14 disposed at regular intervals. Preferably, these plates are at the edges of the belts, with each plate connected to the adjoining belt by a pair of metal straps 13. The plates carried by one belt are so spaced and oriented relative to those carried by the other belt that the plates traveling through the treatment zone are disposed in superimposed pairs. To help hold the plates in a horizontal position as they travel through the treatment zone and tank 5, stationary tracks 22 are mounted in fixed position in both places beside the conveyor. These tracks may take the form of bars, along which the lower plates slide, whereby the plates are supported and prevented from sagging.

For best results, the plates are made of pinchbeck, which will not be affected by water and which rapidly conducts heat and cold. One surface of each plate is covered with water-staturable material 15, preferably calico. This material is on the sides of the plates that are closest to each other as they travel through the treatment zone; in other words, calico is sandwiched between the pinchbeck plates and attached thereto.

It will be understood that the plates supported by the horizontal portion of belt 3 just before it reaches belt 2 at the beginning of the treatment zone are fully exposed so that plantlets 16 to be treated can be laid on the saturable material covering the plates attached to belt 3. As the two belts come together at the entrance to the treatment zone, the saturable material on the upper plates is brought down onto the plantlets and they are carried through the treatment zone between the superimposed plates.

As the plates attached to belt 2 move upwardly away from belt 3 in the water tank, the treated plantlets remain with belt 3 and are exposed for removal. In this tank the calico on the metal plates is soaked with water so that it will be in saturated condition when it once again enters the treatment zone at the opposite end of the equipment. Consequently, the plantlets are maintained wet while they are being subjected to cold shock in refrigeration apparatus $4-4_1$.

Figure 2:
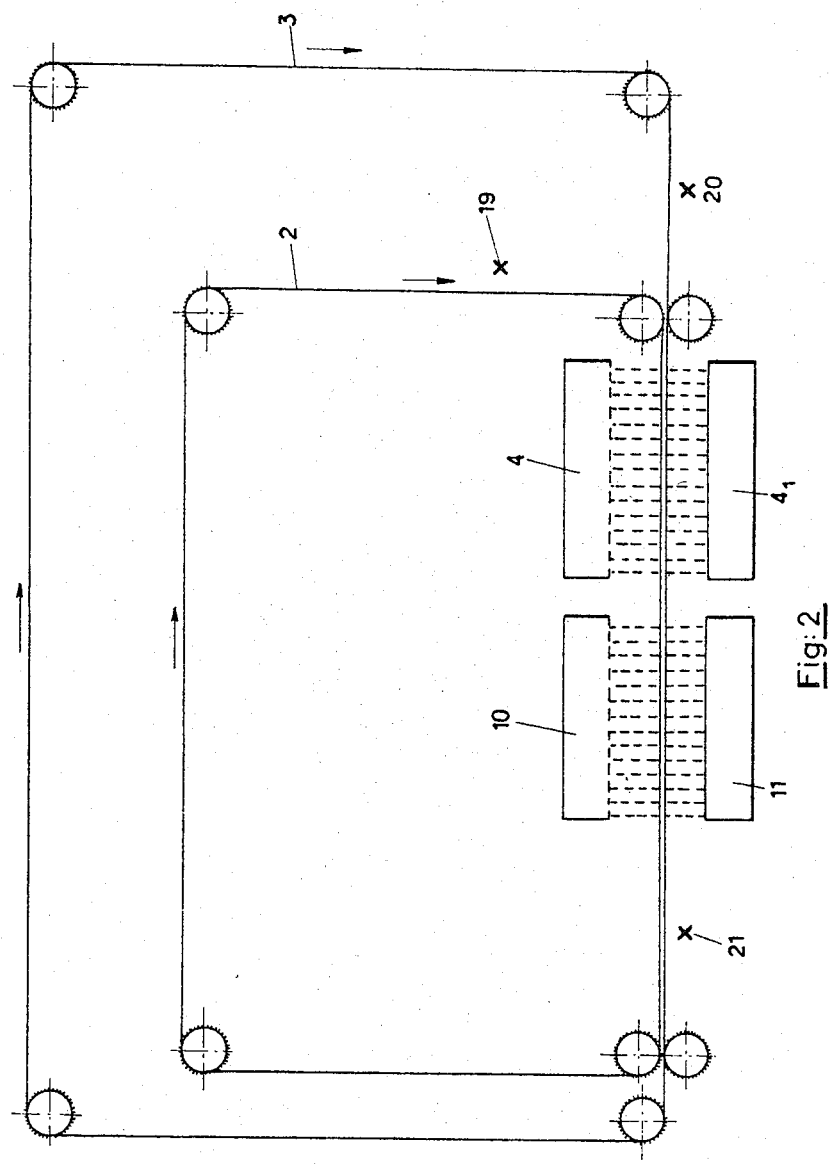
FIG. 2 is a similar view of a modification.

In the modification shown in FIGS. 2 and 4, the two cooperating endless conveyor belts 2 and 3 are not provided with metal plates permanently connected to them as in the first embodiment of the invention. Instead, as indicated in FIG. 4, each belt is provided with pairs of superimposed clips 13' that project laterally from an edge of the belt. The clips in each pair are secured at one end to the opposite sides of the adjoining belt, and the outer free ends of the two clips are curved outwardly away from each other. Plantlets that are to be treated are placed between a pair of metal plates 17 lined with saturable material, such as calico, that was saturated with water in any suitable manner before the plantlets are laid in place. The "sandwich" thus formed is inserted in the gaps between the projecting portions of the clips, where it is held by the pressure of the clips against it. Since each conveyor belt carries individual pairs of superimposed plates independently of the other belt, the plates carried by one belt are so positioned relative to those carried by the other belt that they will not meet each other at the entrance to the treatment zone. This is accomplished by staggering or alternating the plates carried by one belt through the treatment zone with those carried by the other belt through that zone.

It will be noted that superimposed or pairs of plates are attached to belt 2 at a loading station 19 in FIG. 2, and other plates are attached to belt 3 in the same way at loading station 20. The two belts therefore can be loaded independently of each other without interference. A single unloading station 21 at the exit end of the treatment zone is sufficient for removing the plates from both belts in order to retrieve the treated plantlets.

Of course, the invention is not limited to the examples of embodiment described above, for which other forms of embodiment could be provided, without going outside of the scope of the invention for that purpose.

What I claim is:

1. In apparatus for treating plantlets by cold shock as they pass through a treatment zone, an endless traveling conveyor having a portion extending through the treatment zone, pairs of metal plates disposed at regular intervals along said portion of the conveyor, and means attached to the conveyor holding the plates in each pair in superimposed relation to hold plantlets between them.

2. In apparatus as recited in claim 1, the opposed inner surfaces of each pair of superimposed plates being covered with water-saturable material, and means for saturating said material with water before the plates enter the treatment zone.

3. In apparatus as recited in claim 2, said plates being made of pinchbeck and said saturable material being calico.

4. In apparatus as recited in claim 1, the opposed inner surfaces of each pair of superimposed plates being covered with water-saturable material, a water tank, and means directing said conveyor into the tank after it leaves the treatment zone, whereby to saturate said material before it returns to the treatment zone.

5. In apparatus for treating plantlets by cold shock as they pass through a treatment zone, an endless traveling conveyor having a portion extending through the treatment zone, pairs of metal plates disposed at regular intervals along said portion of the conveyor, and means attached to the conveyor and projecting laterally therefrom for holding the plates in each of said pairs in superimposed relation at one side of the conveyor, the superimposed plates being adapted to hold plantlets between them.

6. In apparatus as recited in claim 5, said conveyor portion being substantially horizontal, and a stationary track beside said horizontal portion and beneath said pairs of plates supporting them against sagging.

7. In apparatus for treating plantlets by cold shock as they pass through a treatment zone, an endless traveling conveyor belt having a portion extending through the treatment zone, clips secured to the opposite sides of the belt at intervals along it and projecting laterally from one edge of the belt, the clips being superimposed in pairs with a gap between the projecting portions of each pair, and pairs of superimposed metal plates removably held by said clips in said gaps beside said portion of the belt, each pair of superimposed plates being adapted to hold plantlets between them.

8. In apparatus for treating plantlets by cold shock as they pass through a treatment zone, an endless pair of traveling conveyor belts having superimposed lengths extending through the treatment zone, a row of metal plates beside each belt and disposed at regular intervals along an edge of it, and means connecting each row of plates to the adjoining belt, the plates being positioned to form superimposed pairs along said superimposed lengths of the belts for holding plantlets between the plates, and said belts being spread apart at opposite ends of said superimposed lengths to permit loading and unloading of the plantlets.

9. In apparatus as recited in claim 8, said belts forming vertical loops with one of the loops disposed inside the other, said superimposed lengths of the belts being substantially horizontal and located at the bottoms of the loops between separated upwardly extending lengths of the belts.

References Cited by the Examiner

UNITED STATES PATENTS

| | | | |
|---|---|---|---|
| 2,059,970 | 11/1936 | Robillard | 62—104 |
| 2,494,027 | 1/1950 | Anderson | 62—102 |

ABRAHAM G. STONE, *Primary Examiner.*

R. E. BAGWILL, *Assistant Examiner.*